United States Patent
Hashimoto

(10) Patent No.: US 8,393,667 B2
(45) Date of Patent: Mar. 12, 2013

(54) OCCUPANT PROTECTION DEVICE

(75) Inventor: Syuzo Hashimoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 71 days.

(21) Appl. No.: 13/147,927

(22) PCT Filed: Feb. 11, 2010

(86) PCT No.: PCT/IB2010/000262
§ 371 (c)(1),
(2), (4) Date: Aug. 4, 2011

(87) PCT Pub. No.: WO2010/092458
PCT Pub. Date: Aug. 19, 2010

(65) Prior Publication Data
US 2011/0291448 A1   Dec. 1, 2011

(30) Foreign Application Priority Data
Feb. 16, 2009   (JP) .................................. 2009-032843

(51) Int. Cl.
*B60N 2/22* (2006.01)
*B60N 2/427* (2006.01)
*B60N 2/64* (2006.01)

(52) U.S. Cl. .................. 296/65.16; 296/68.1; 296/65.17; 297/216.1; 297/216.14

(58) Field of Classification Search .................... 296/64, 296/65.01, 68.1, 65.02, 65.16, 65.17, 187.11, 296/187.12; 297/216.1, 216.13, 216.14, 297/216.19
See application file for complete search history.

(56) References Cited

U.S. PATENT DOCUMENTS
| | | | |
|---|---|---|---|
| 5,203,600 A | 4/1993 | Watanabe et al. | |
| 5,538,117 A * | 7/1996 | Bouchez | 188/371 |
| 6,367,859 B1 | 4/2002 | Flory et al. | |
| 6,454,351 B2 * | 9/2002 | Motozawa et al. | 297/216.16 |

(Continued)

FOREIGN PATENT DOCUMENTS
| | | |
|---|---|---|
| DE | 41 21 548 A1 | 1/1992 |
| DE | 195 40 394 A1 | 5/1997 |

(Continued)

OTHER PUBLICATIONS

International Search Report in International Application No. PCT/IB2010/000262; dated Jul. 19, 2010.

(Continued)

*Primary Examiner* — Glenn Dayoan
*Assistant Examiner* — Gregory Blankenship
(74) *Attorney, Agent, or Firm* — Oliff & Berridge, PLC

(57) ABSTRACT

An occupant protection device includes: a seat cushion; a seat back; a base portion provided in a vehicle body; a support portion that is provided in the seat back and that overlaps a backrest of the seat back as viewed from front of a vehicle; a reclining angle adjustment portion that changes a reclining angle of the seat back by moving the support portion with respect to the base portion; and a contact portion that is provided in the vehicle body. If the support portion is displaced rearward in a longitudinal direction of the vehicle due to a rearward load that exceeds a prescribed magnitude being applied to the seat back, the contact portion comes into contact with the support portion on both the right and left sides of the seat back with respect to a center portion of the seat back.

10 Claims, 7 Drawing Sheets

U.S. PATENT DOCUMENTS

| | | | |
|---|---|---|---|
| 7,021,706 B2* | 4/2006 | Aufrere et al. | 297/216.14 |
| 7,156,461 B2* | 1/2007 | Bolte et al. | 297/344.1 |
| 7,293,830 B2* | 11/2007 | Marotta et al. | 297/216.17 |
| 7,377,584 B2* | 5/2008 | Griswold et al. | 297/216.12 |
| 7,510,228 B2* | 3/2009 | Ito et al. | 296/65.17 |
| 7,753,429 B2* | 7/2010 | Villeminey | 296/65.16 |
| 7,762,604 B1* | 7/2010 | Lindsay | 296/64 |
| 7,819,478 B2* | 10/2010 | Griswold et al. | 297/378.13 |
| 2004/0164595 A1* | 8/2004 | Aufrere et al. | 297/216.14 |
| 2007/0273171 A1* | 11/2007 | Ito et al. | 296/65.16 |
| 2008/0203785 A1 | 8/2008 | Patwardhan | |
| 2011/0291448 A1* | 12/2011 | Hashimoto | 297/216.14 |

FOREIGN PATENT DOCUMENTS

| | | |
|---|---|---|
| DE | 199 49 728 A1 | 4/2001 |
| DE | 10 2008 005 360 A1 | 8/2008 |
| JP | A-2004-136732 | 5/2004 |
| JP | A-2005-178443 | 7/2005 |

OTHER PUBLICATIONS

Written Opinion of the International Searching Authority in International Application No. PCT/IB2010/000262; dated Jul. 19, 2010.

* cited by examiner

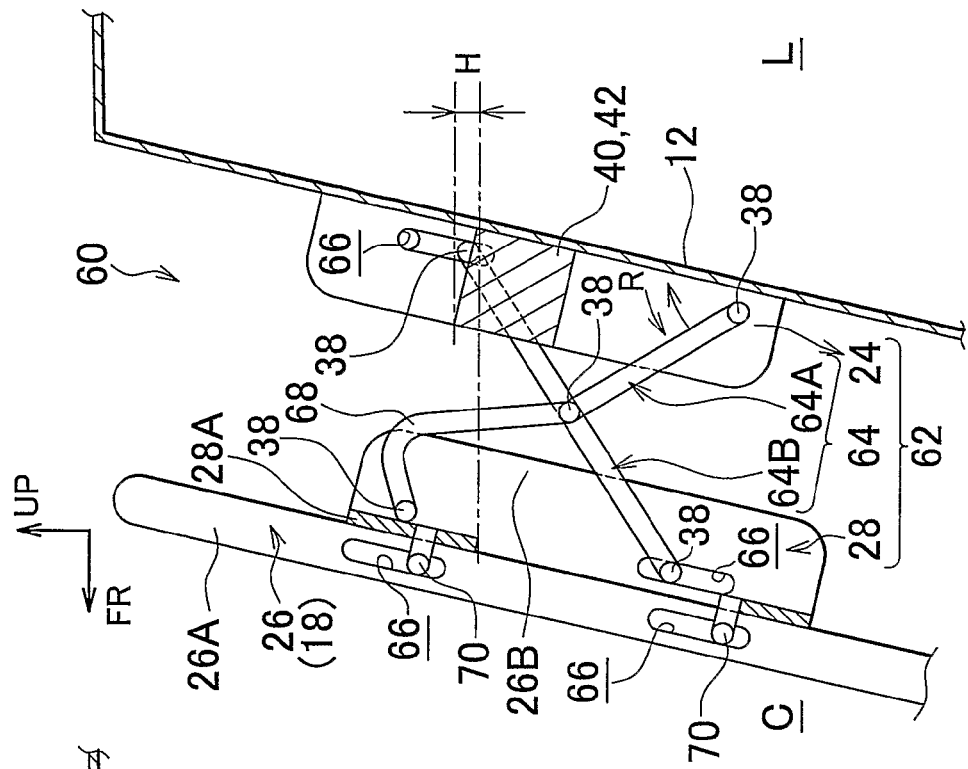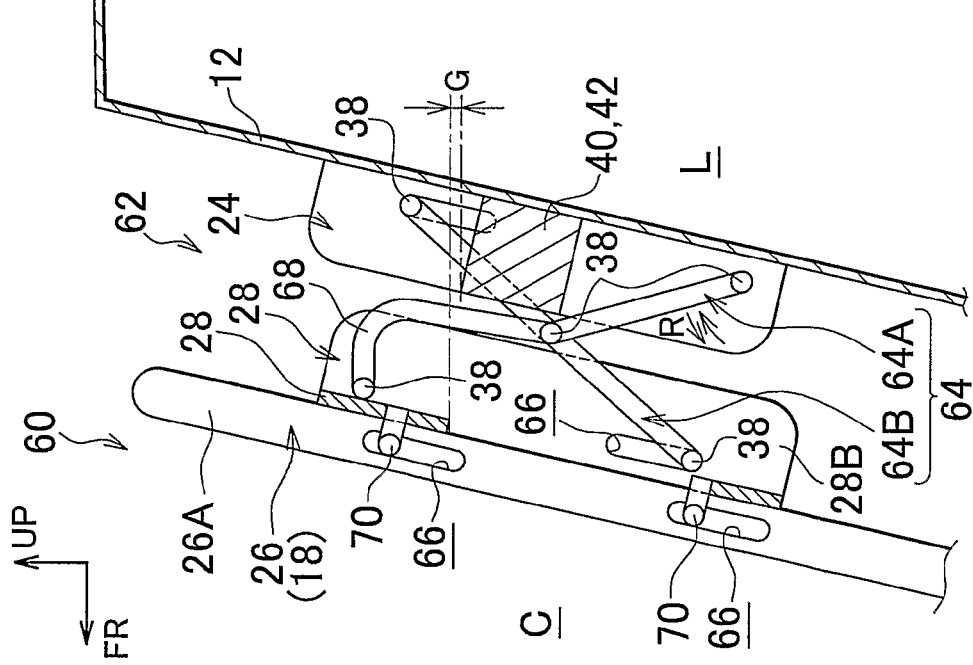

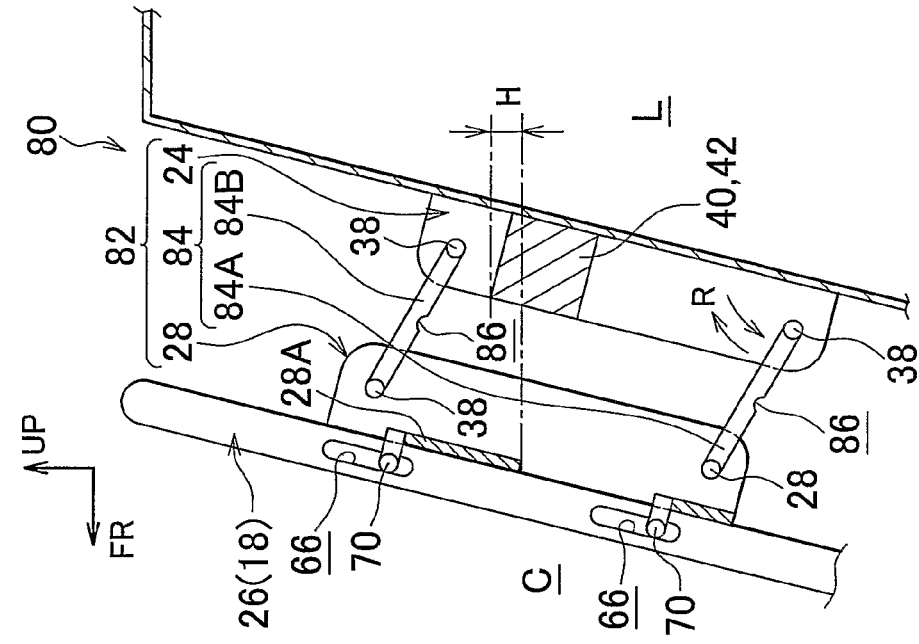
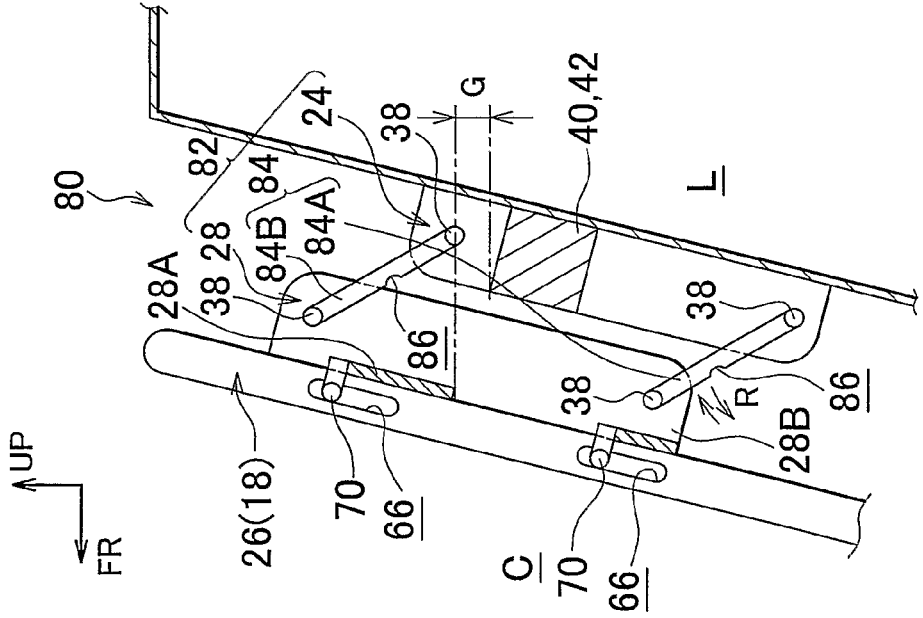

OCCUPANT PROTECTION DEVICE

BACKGROUND OF THE INVENTION

1. Field of the Invention

The present invention relates to an occupant protection device that is provided in a seat in which the position of the seat back can be changed.

2. Description of the Related Art

An occupant protection device that controls the reclining angle adjuster so that the seat back is more quickly brought to a generally perpendicular upright position when a collision prediction portion predicts a rear-end collision of a host vehicle, compared to when a occupant manually adjusts a reclining angle, is described in Japanese Patent Application Publication No. 2005-178443 (JP-A-2005-178443). A vehicle seat in which a reclining mechanism for a rear seat is provided between a partition panel and the seat back is described in Japanese Patent Application Publication 2004-136732 (JP-A-2004-136732).

The protection afforded to occupants against the rear-end collisions by the above-described technology may be improved.

SUMMARY OF THE INVENTION

The present invention provides an occupant protection device that effectively protects an occupant in a rear-end collision of a vehicle.

The occupant protection device according to one aspect of the present invention includes: (i) a seat cushion; (ii) a seat back, (iii) a base portion that is provided in a vehicle body; (iv) a support portion that is provided in the seat back and that overlaps a backrest of the seat back, as viewed from front of the vehicle; (v) a reclining angle adjustment portion that changes a reclining angle of the seat back by moving the support portion with respect to the base portion; and (vi) a contact portion that is provided in the vehicle body. If the support portion is displaced rearward in a longitudinal direction of the vehicle due to a rearward load that exceeds a prescribed magnitude being applied to the seat back, the contact portion comes into contact with the support portion in both the right and left sides of the seat back with respect to a center portion of the seat back.

In the above occupant protection device, when the rearward load that exceeds the prescribed magnitude is applied to the seat back upon the rear-end collision, for example, the support portion is displaced rearward along with the seat back with respect to the base portion. If the support portion is displaced rearward, the support portion contacts the contact portion in both the right and left sides of the seat back.

Thus, when the load as described as above is input, the relative entry of the base portion, which is provided such as in the vehicle body, into the seat back is prevented or effectively suppressed by the contact between the support portion and the contact portion. Specifically, the load from the base portion and the like is supported by the whole seat back through the contact portion and the support portion. Thus, it is possible to prevent or effectively suppress the load from acting locally on the seat back.

As described above, it is possible with the above occupant protection device to effectively protect the occupant against the rear-end collision.

Alternatively, an occupant protection device according to one aspect of the present invention includes: (i) a seat cushion, (ii) a seat back, (iii) a base portion that is provided in a vehicle body; (iv) a support portion that is provided in the seat back and that overlaps a backrest of the seat back, as viewed from front of a vehicle; (v) a reclining angle adjustment portion that changes a reclining angle of the seat back by moving the support portion with respect to the base portion; and (vi) a contact portion that is provided in the vehicle body. If the support portion is displaced rearward in the longitudinal direction of the vehicle due to the rearward load that exceeds the prescribed magnitude being applied to the seat back; the contact portion contacts the support portion and suppresses rearward displacement of the support portion and rotation of the support portion about an axis along a vertical direction of the vehicle.

In the above occupant protection device, when the rearward load that exceeds the prescribed magnitude is applied on the seat back upon the rear-end collision, for example, the support portion is displaced rearward along with the seat back with respect to the base portion. When the support portion is displaced rearward, the support portion contacts the contact portion. Then, the rearward displacement of the support portion and the rotation of the support portion about the axis in the vertical direction of the vehicle are suppressed.

Thus, when the load as described as above is input, the relative entry of the base portion, which is provided such as in the vehicle body, and the like in the seat back is prevented or effectively suppressed by the contact between the support portion and the contact portion. In other words, the load from the base portion and the like is supported by the whole seat back through the contact portion and the support portion, and thus, it is possible to prevent or effectively suppress the load from acting locally on the seat back.

As described above, it is possible with the above occupant protection device to effectively protect the occupant against the rear-end collision.

In the above occupant protection device, the reclining angle adjustment portion may adjust a position of the support portion between a forward portion and a rearward portion, and the contact portion may at least partially overlap the support portion, as viewed from the front of the vehicle.

In the above occupant protection device, when the support portion is in the forward position, the contact portion has a region where the support portion overlaps (hides) the contact portion, as viewed from the front of the vehicle. Thus, when the support portion is in the forward position and the rearward load that exceeds the prescribed magnitude acts on the seatback, the support portion contacts the contact portion. Accordingly, it is possible to effectively protect the occupant against the rear-end collision.

In the above occupant protection device, when the support portion is in the rearward position, a region where the contact portion is located may differ from a region where the support portion is located, as viewed from the front of the vehicle.

In the above occupant protection device, when the support portion is held in the rearward position, the contact portion does not have the region where the support portion overlaps the contact portion, as viewed from the front of the vehicle. In other words, it is possible to offset the base portion and the support portion with respect to each other in the vertical direction of the vehicle or in a seat width direction, and thus, it contributes to the overall compact configuration.

In the above occupant protection device, the contact portion may be a drive source for the reclining angle adjustment portion that generates power to move the support portion, and a control unit that controls the drive source. In this case, the drive source may contact the support portion on either one of the right side and the left side of the seat back with respect to the center portion of the seat back, and the control unit may contact the support portion on the other of the right side and the left side of the seat back with respect to the center portion of the seat back.

In the above occupant protection device, the drive source that drives the reclining angle adjustment portion and the control unit are disposed on the opposite sides of the seat back with respect to the center portion of the seat back and are functioned as the contact portion. Therefore, compared to a configuration which has an exclusive member for the contact portion or a configuration in which the contact portion only includes the exclusive member, it is possible to simplify the structure of the occupant protection device and to reduce its size.

The above occupant protection device may further include a collision prediction sensor that determines whether a rear-end collision is imminent. The control unit may control the drive source to move the support portion to the forward position when the collision prediction sensor determines that the rear-end collision is imminent.

In the above occupant protection device, for example, when the rear-end collision being imminent determined by the collision prediction sensor, the drive source is actuated by the control unit to move the support portion to the forward position (or, when the support portion is already in the forward position upon prediction of the rear-end collision, the drive source is not actuated, and the support portion is maintained at the forward position). When the rear-end collision occurs subsequently, the rearward load that exceeds the prescribed magnitude acts on the seat back from the occupant. The support portion contacts the contact portion that overlaps the support portion, as viewed from the front of the vehicle, as described above. Accordingly, it is possible to effectively protect the occupant against the rear-end collision, as described above.

In the above occupant protection device, the reclining angle adjustment portion may be a link mechanism that connects the link mechanism to the base portion and the support portion and that has multiple links. At least one link of the link mechanism may include a deformation-promoting portion that undergoes bending deformation when the rearward load is input to the seat back. The support portion may be guided toward the contact portion by deformation of the link at the deformation-promoting portion.

In the above occupant protection device, the position of the link mechanism of the reclining angle adjustment portion is changed with respect to the base portion, and thereby, the support portion moves relatively to the base portion. At least one link of this link mechanism is provided with the deformation-promoting portion. Thus, when the rearward load that exceeds the prescribed magnitude acts on the seat back, the link is deformed at the deformation-promoting portion. In conjunction with the above, the support portion (or a part of the support portion) is guided by the deformation of the link to contact the contact portion. Specifically, due to the deformation of the link at the deformation-promoting portion, the support portion is guided toward the contact portion by following a different trajectory from a normal link trajectory, and contacts the contact portion in an appropriate position.

In the above occupant protection device, the base portion and the contact portion may be fixed to a panel member that separates an occupant compartment and a space that is located behind the occupant compartment.

In the above occupant protection device, the forward load acts in a manner that, along with the base portion, the panel member approaches the seat back upon the rear-end collision, for example. However, the load is dispersed by the contact between the support portion and the contact portion or by the contacts between the support portion and the drive source and between the support portion and the control unit. Accordingly, the intrusion of the panel member along with the base portion into the seat back is prevented or effectively suppressed. Favorable occupant protection performance can be obtained in a configuration in which the panel member is fixed to the base portion. One of the base portion and the contact portion may be configured to fix the panel member through the other.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 6A is a side view that schematically shows main components of an occupant protection device according to a second embodiment, and that also shows the seat back in the rearward position;

FIG. 6B is a side view that schematically shows the main components of the occupant protection device according to the second embodiment, and that also shows the seat back in the forward position;

FIG. 7A is a side view that schematically shows main components of an occupant protection device according to a third embodiment, and that also shows the seat back in the rearward position; and FIG. 7B is a side view that schematically shows the main components of the occupant protection device according to the third embodiment, and that also shows the seat back in the forward position.

DETAILED DESCRIPTION OF EMBODIMENTS

An occupant protection device 10 according to one embodiment of the present invention will be described with reference to FIG. 1 to FIG. 5. The arrow FR, the arrow UP, and the arrow W appropriately shown in each drawing respectively indicate a forward direction, an upward direction, and a vehicle width direction, which generally corresponds to a seat width direction, of an automobile in which the occupant protection device 10 is installed.

Figure 3:
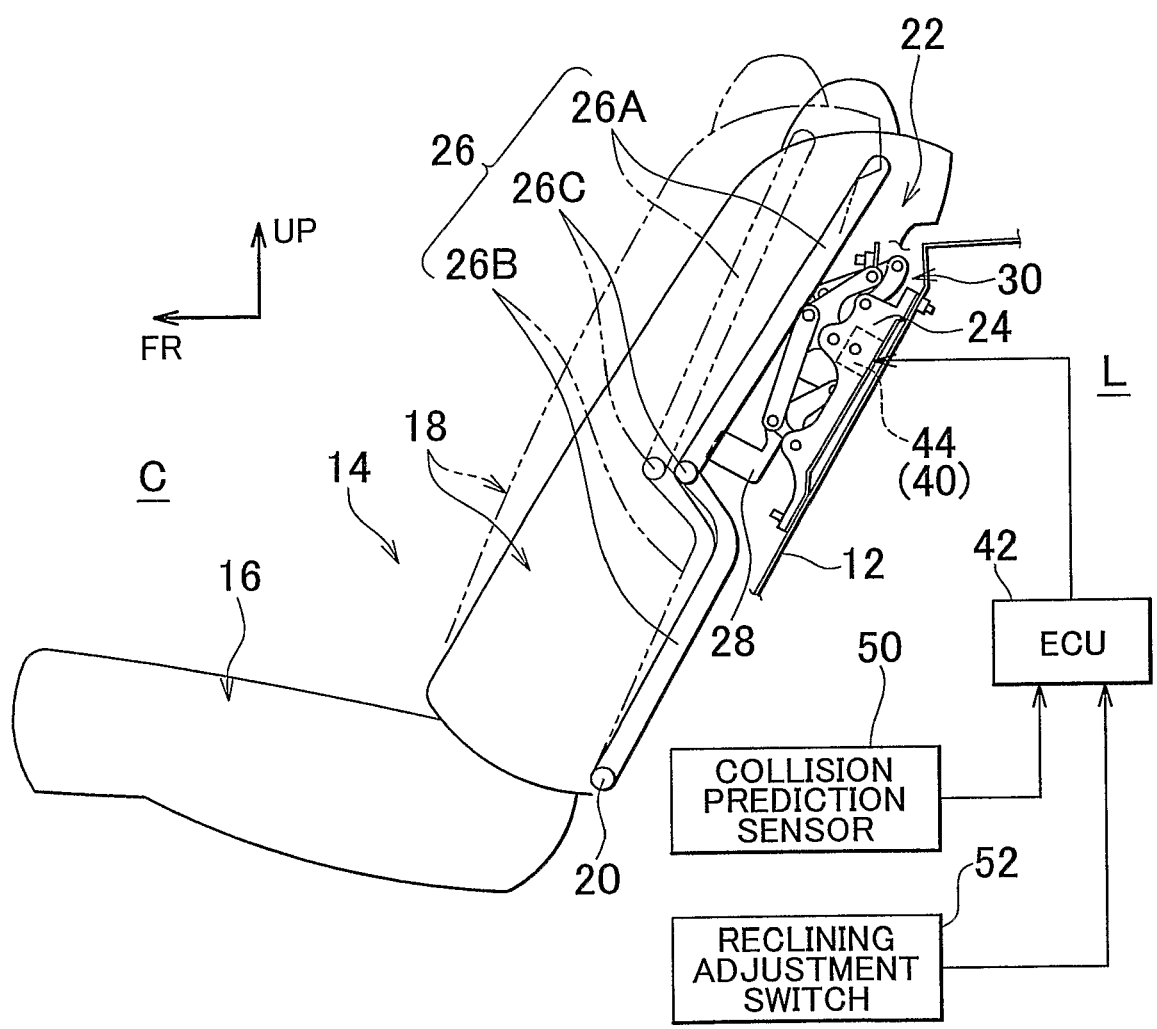
FIG. 3 is a side view that schematically shows a rear seat to which the occupant protection device according to the first embodiment is applied.
Figure 4:
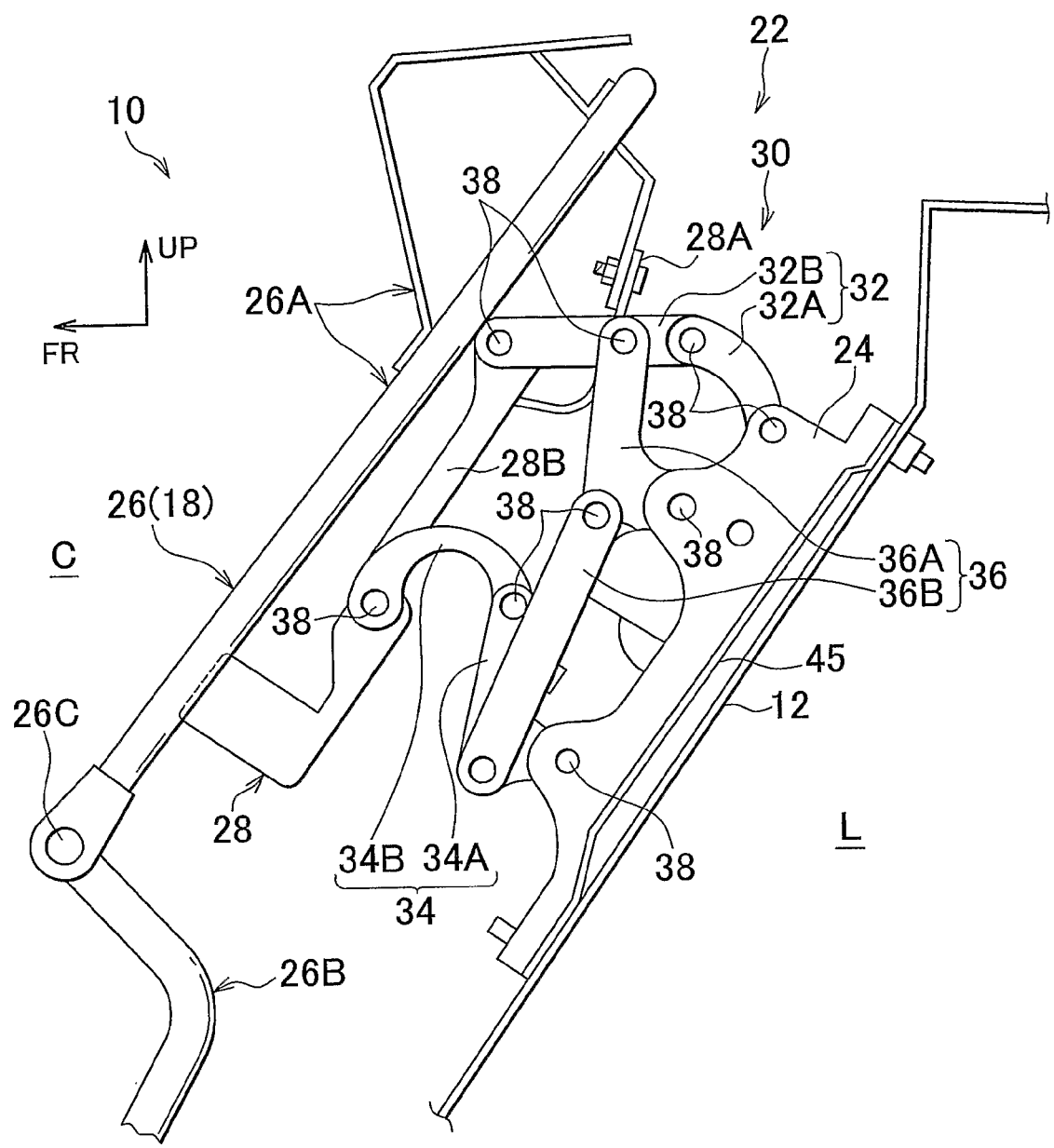
FIG. 4 is a side view that shows a seat back when adjusted to a forward position by the rear seat adjuster according to the first embodiment.

FIG. 3 is a schematic view, from the side, of a rear seat 14 that includes the occupant protection device 10. As shown in the drawing, the occupant protection device 10 is provided in a rear seat 14 disposed immediately before a partition panel 12 that separates the occupant compartment C from the luggage compartment L.

The rear seat 14 includes a seat cushion 16 and a seat back 18. The rear end of the seat cushion 16 is connected to the lower end of the seat back 18. In the rear seat 14 according to the first embodiment, the lower end of the seat back 18 is rotatably connected to the seat cushion 16 about a reclining shaft 20 disposed along the seat width direction. Accordingly, the reclining angle of the seat back 18 is adjustable with respect to the seat cushion 16. The reclining angle is the angle between the seat cushion 16 and the seat back 18.

The occupant protection device 10 includes a rear seat adjuster 22 that is a rear seat reclining mechanism disposed between the partition panel 12 and the seat back 18. The rear seat adjuster 22 moves the upper portion of the seat back 18 in the longitudinal direction of the vehicle. Accordingly, The rear seat 14 is configured that the seat back 18 rotates about the reclining shaft 20 only within a specified angular range.

Figure 1:
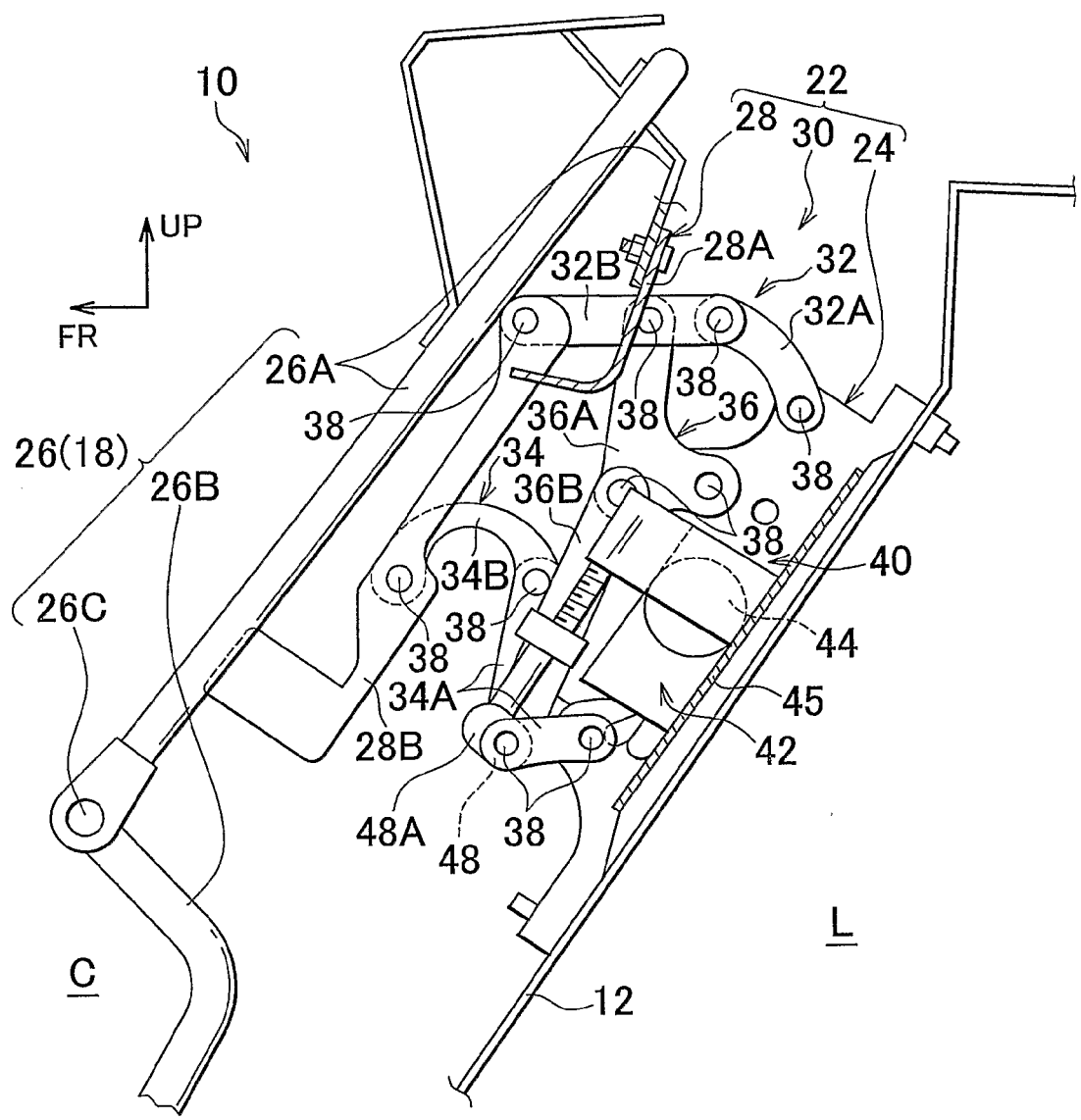
FIG. 1 is a side view that shows the main components of an occupant protection device according to a first embodiment of the present invention.
Figure 2:
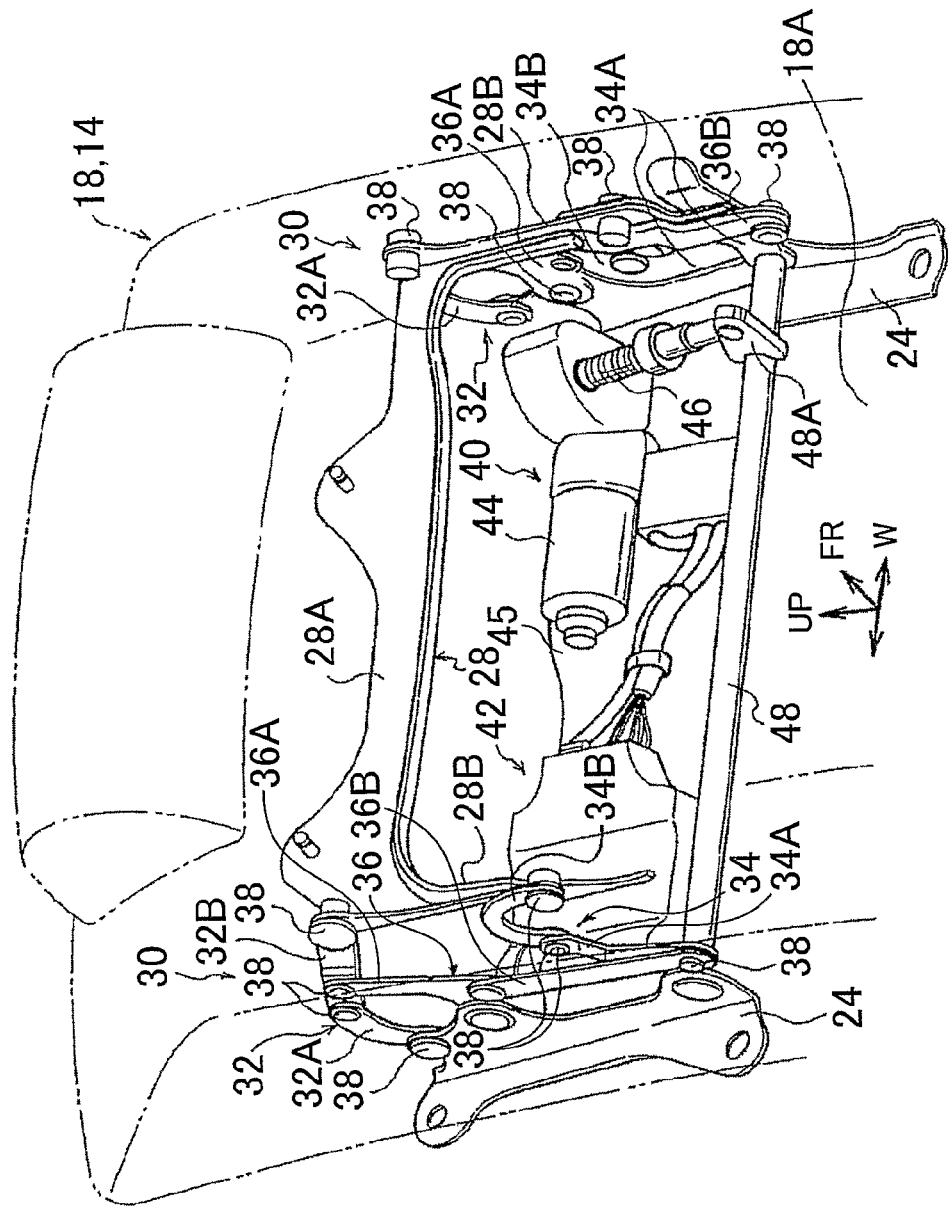
FIG. 2 is a perspective view that shows the overall configuration of a rear seat adjuster that constitutes the occupant protection device according to the first embodiment.

Specifically, as shown in FIG. 1 and FIG. 2, the rear seat adjuster 22 includes: a first bracket 24 that forms a base portion fixed to the partition panel 12; a second bracket 28 that forms a support portion fixed to a seat back frame 26 of the seat back 18; and a link mechanism 30 that forms a reclining angle adjustment portion that connects the link mechanism 30 to the first bracket 24 and the second bracket 28. The link mechanism 30 allows the second bracket 28 to move in the longitudinal direction of the vehicle with respect to the first bracket 24.

In this embodiment, as shown in FIG. 2, a pair of the first brackets 24 are positioned on the right and left sides of the partition panel 12. The second bracket 28 includes a seat back attachment portion 28A and a leg portion 28B. The seat back attachment portion 28A extends in the seat width direction, and is fixed to an upper portion of the seat back frame 26 of the seat back 18. The leg portions 28B extend downward from both ends of the seat back attachment portion 28A in the seat width direction. That is, the second bracket 28 is formed in a generally inverted U-shape, when viewed from the front of the vehicle. The seat back attachment portion 28A is fitted across the center portion of the seat back 18 in the width direction, and is fixed in a portion where the seat back attachment portion 28A overlaps in a front view a backrest 18A (see FIG. 2) that supports the back of a seated occupant.

In the second bracket 28, the right and left leg portions 28B are each connected to (supported by) a corresponding one of the right and left first brackets 24. The lower end portions of the right and left pair of the leg portions 28B are also fixed to the seat back frame 26 (see FIG. 1).

As shown in FIG. 1 and FIG. 2, the link mechanism 30 includes an upper link mechanism 32, a lower link mechanism 34, and a connecting link mechanism 36. The upper link mechanism 32 connects the first bracket 24 to an upper portion of the second bracket 28. The lower link mechanism 34 connects the first bracket 24 to a lower portion of the second bracket 28. The connecting link mechanism 36 connects the upper link mechanism 32 and the lower link mechanism 34. Each of the upper link mechanism 32, the lower link mechanism 34, and the connecting link mechanism 36, the first bracket 24, and the second bracket 28 are connected to each other by a link pin 38 for relative rotation about an axis along the seat width direction. However, it will be simply described below that these components are connected to each other.

The upper link mechanism 32 includes a rear link 32A and a front link 32B. A rear end of the rear link 32A is connected to the first bracket 24. A front end of the rear link 32A is connected to a rear end of the front link 32B. A front end of the front link 32B is connected to the second bracket 28. The lower link mechanism 34 includes a rear link 34A and a front link 34B. A rear end of the rear link 34A is connected to the first bracket 24. A front end of the rear link 34A is connected to a rear end of the front link 34B. A front end of the front link 34B is connected to the second bracket 28. The connecting link mechanism 36 includes an upper link 36A and a lower link 36B. An upper end of the upper link 36A is connected to a middle portion of the front link 32B. A rear end of the upper link 36A is connected to the first bracket 24. An upper end of the lower link 36B is connected to a middle portion of the upper link 36A. A lower end of the lower link 36B is connected to a middle portion of the rear link 34A.

Figure 5:
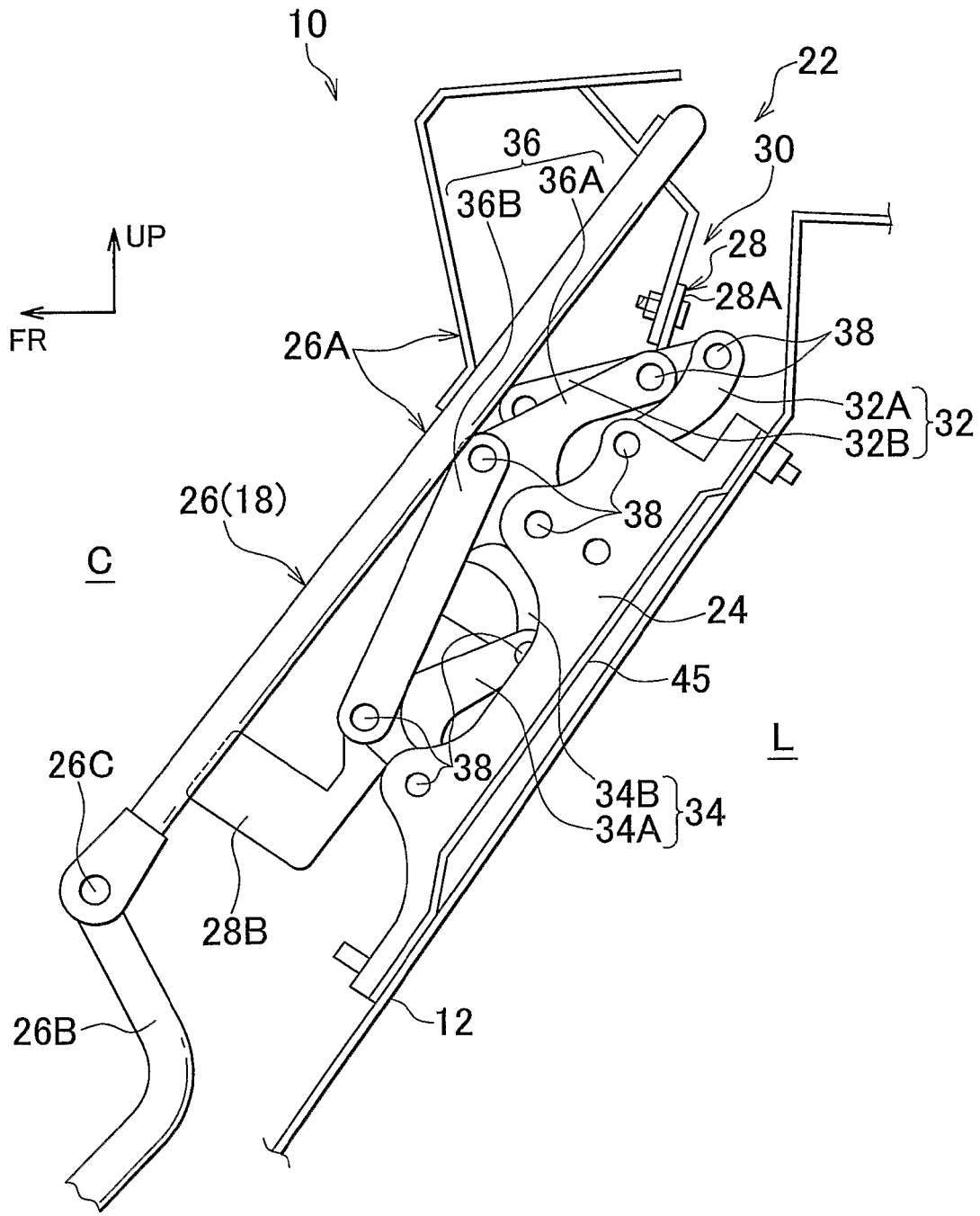
FIG. 5 is a side view that shows the seat back when adjusted to a rearward position by the rear seat adjuster according to the first embodiment.

Accordingly, in the link mechanism 30, the rear link 34A of the lower link mechanism 34 rotates about the connecting point between the rear link 34A and the first bracket 24 within a specified angular range. This allows the relative movement of the second bracket 28 to the first bracket 24 (reclining angle change of the seat back 18) between a forward position in FIG. 4 and a rearward position in FIG. 5. The rearward movement of the second bracket 28 is limited to the rearward position that is shown in FIG. 5. Due to the movement of the second bracket 28 between the forward position and the rearward position, the seat back 18 may be adjusted in a range from a state where the seat back 18 is in a forward position (see the phantom line in FIG. 3) to a maximum reclined position (see the solid line in FIG. 3).

For further explanation of the above point, the seat back frame 26 includes an upper frame 26A, a lower frame 26B, and a rotational shaft 26C between the upper frame 26A and the lower frame 26B. The seat back attachment portion 28A of the second bracket 28 is fixed to the upper frame 26A. A lower end of the lower frame 26B rotates about the reclining shaft 20. A lower end of the upper frame 26A is connected to the upper end of the lower frame 26B in a manner so that the relative angle of the upper frame 26A to the lower frame 26B about the rotational shaft 26C, disposed the seat width direction, may be adjusted. In the rear seat adjuster 22, a angle between the upper frame 26A and the lower frame 26B is changed at the rotational shaft 26C, and then the seat back frame 26 and the second bracket 28 follows the relative movement between the forward position and the rearward position with respect to the first bracket 24. Accordingly, the reclining angle of the seat back 18 may be adjusted between the forward position of the seat back 18, where the seat back 18 is upright, and the reclined position, where the seat back 18 is reclined to furthest rearward.

As shown in FIG. 2, the rear seat adjuster 22 further includes a power unit 40 and an ECU (electric control unit) 42. The power unit 40 generates power to drive the second bracket 28 between the forward position and the rearward position. The ECU 42, as a control unit, controls the actuation of the power unit 40.

The power unit 40 includes a geared motor 44 as a drive source, and a reclining screw 46. The reclining screw 46 reciprocates (moves linearly) in a vertical direction of the vehicle in accordance with forward/reverse rotation of the geared motor 44. In this embodiment, the power unit 40 is fixedly supported on the left side of a region between the right and left pair of the first brackets 24 with respect to a center portion of the seat back 18 in the seat width direction. Then, the power unit 40 pushes and pulls a bulging portion 48A in the vertical direction. The bulging portion 48A bulges from a drive rod 48 in its radial direction. The drive rod 48 is suspended between middle portions (lower ends) of the right and left rear links 34A. Accordingly, the rear link 34A rotates about a connecting point between the rear end of the rear link 34A and the first bracket 24, and thereby the second bracket 28 is driven between the forward position and the rearward position.

The ECU 42 is fixedly supported on the right side of the region between the right and left first brackets 24 with respect to a center portion of the seat back 18 in the seat width direction. In other words, The ECU 42 is supported closer to the first bracket 24 on the left side of the seat back 18. In this embodiment, the power unit 40 and the ECU 42 are fixed to a support plate (frame) 45 that is suspended between the right and left first brackets 24. Also, in this embodiment, the ECU 42 is disposed on the opposite side of a center line of the seat back 18 in the seat width direction from the power unit 40. Further, in this embodiment, the power unit 40 is arranged parallel with the ECU 42 in the seat width direction. Specifically, the power unit 40 and the ECU 42 are disposed at the substantially same height in the vertical direction of the vehicle, and are also disposed on the drive rod 48.

Based on a signal from a reclining adjustment switch 52, the ECU 42 initiates the forward rotation (in a rotational direction to increase the reclining angle) or the reverse rotation (in a rotational direction to reduce the reclining angle) of the geared motor 44, or terminates the rotation of the geared motor 44. The power unit 40 may further includes a position sensor (not shown). Based on a signal from the position sensor, the ECU 42 can detect the reclining angle of the seat back 18, or detect whether the seat back 18 is reclined.

The occupant protection device 10 forcibly moves the seat back 18 to the forward position when the rear-end collision of the automobile, to which the occupant protection device 10 is applied, is predicted. More specifically, a collision prediction sensor 50 is electrically connected to the ECU 42. The collision prediction sensor 50 may be, for example, a distance sensor such as a millimeter-wave radar, that transmits a signal to the ECU 42 indicating the distance to an obstacle (e.g. another automobile, a fixed object on the street) in front of or behind the automobile.

When the signal from the collision prediction sensor 50 indicates that a rear-end collision is imminent, the ECU 42 actuates the geared motor 44, if the seat back 18 is reclined, to bring the seat back 18 to the forward position. The actuation of the geared motor 44 when the rear-end collision is predicted may further include the input of a signal that indicates whether the rear seat 14 is occupied by an occupant.

In the occupant protection device 10, the forward position of the seat back 18 is set so that the occupant in the rear seat 14 is favorably restrained by a seatbelt and/or various airbags (not shown), at least against a rear-end collision (or, such that the occupant is appropriately protected).

In addition, in the occupant protection device 10, if rear-end collision occurs while the occupant is seated in the rear seat 14 with the seat back 18 (the second bracket 28) in the forward position, the seat back attachment portion 28A of the second bracket 28 is displaced rearward to contact the power unit 40 and the ECU 42.

Specifically, as shown in FIG. 1, when the second bracket 28 is in the forward position, the seat back attachment portion 28A is located above the power unit 40 and the ECU 42. Meanwhile, the front link 34B of the lower link mechanism 34 is in the generally inverted U-shape in a side view. A U-shaped curved portion (deformation-promoting portion) of the front link 34B undergoes and promotes deformation of the front link 34B. Accordingly, in the link mechanism 30 of the occupant protection device 10, when a rearward impact that exceeds a prescribed magnitude is received by the upper frame 26A, the front link 34B curves and deforms (undergoes plastic deformation). Then, the seat back attachment portion 28A is guided to the power unit 40 and the ECU 42 that are positioned relatively downward to the rear with respect to the seat back attachment portion 28A.

Next, the function of the embodiment will be described.

In the rear seat 14 to which the above-configured occupant protection device 10 is applied, the occupant may adjust the reclining angle of the seat back 18 by appropriately operating the reclining adjustment switch 52.

If the seat back 18 is reclined and the signal from the collision prediction sensor 50 indicates that a rear-end collision is imminent, the ECU 42 actuates the geared motor 44 in the reverse rotation direction if the occupant is seated on the rear seat 14, for example, to reduce the reclining angle. The seat back 18 of the rear seat 14 then moves from the rearward position to the forward position. If the collision occurs in this state where the seat back 18 has moved to the forward position, the occupant in the rear seat 14 is supported by the seat back 18 in the forward position and appropriately restrained by the seatbelt and the airbag, for example.

If rear-end collision occurs, the inertial force of the occupant may press rearward against the seat back 18 of the rear seat 14 with a rearward load that exceeds a prescribed magnitude. In conjunction, the partition panel 12 may also be pushed toward the seat back 18.

At this time, in the occupant protection device 10, if a rearward load that exceeds the prescribed magnitude acts on the seat back 18, the front link 34B deforms. Thus, the seat back attachment portion 28A is guided downward to the rear and contacts the power unit 40 and the ECU 42. Accordingly, intrusion of the partition panel 12 into the occupant compartment is prevented or effectively minimized by the contact of the second bracket 28 with the power unit 40 and the ECU 42 (an increase of a reaction force due to the contact therebetween). In other words, a forward load of the second bracket 28 is dispersed into the seat back frame 26 through the second bracket 28. Thus, it is possible to prevent or effectively suppress the forward load from the partition panel 12 from action locally on the seat back 18.

Therefore, in the occupant protection device 10 according to the first embodiment, the occupant in the rear seat 14 can effectively be protected against the rear-end collision.

Specifically, a left region of the second bracket 28 contacts the power unit 40, and a right region of the second bracket 28 contacts the ECU 42. Thus, the rotation of the second bracket 28 about an axis in the vertical direction of the vehicle that is caused by the inertia force of the occupant is prevented or effectively suppressed. Therefore, the occupant protection device 10 provides a high occupant protective effect, which is described above. The power unit 40 and the ECU 42 are disposed at the substantially same height in the vertical direction of the vehicle. Thus, the rotation of the second bracket 28 about the axis in the vertical direction of the vehicle that is caused by the inertia force of the occupant is further prevented or effectively suppressed.

Next, other embodiments of the invention will be described. The parts and the portions configured similarly to those of the above embodiment or the configurations described above are basically designated by the same reference numerals as those used in the description of the above embodiment or the configurations described above, and their description is not repeated.

A second embodiment of the present invention will be described below. FIG. 6A is a side view that shows the seat back 18 when adjusted to the rearward position in an occupant protection device 60 of the second embodiment of the present invention. FIG. 6B is a side view that shows the seat back 18 when adjusted to the forward position in the occupant protection device 60. As shown in these drawings, the occupant protection device 60 includes a rear seat adjuster 62 instead of the rear seat adjuster 22, and thus, differs from the occupant protection device 10 of the first embodiment. In addition, the rear seat adjuster 62 includes an X-arm link mechanism 64, which is the link mechanism and the reclining angle adjustment portion, instead of the link mechanism 30, and thus, differs from the rear seat adjuster 22.

More specifically, the X-arm link mechanism 64 includes a first arm 64A and a second arm 64B. A rear end of the first arm 64A is connected to the lower portion of the first bracket 24. A front end of the first arm 64A is connected to the upper portion of the second bracket 28. A rear end of the second arm 64B is connected to the upper portion of the first bracket 24. A front end of the second arm 64B is connected to the lower portion of the second bracket 28. A longitudinal middle portion of the first arm 64A is connected to a longitudinal middle portion of the second arm 64B.

A connecting portion between the second arm 64B and the first bracket 24 is slidable in the vertical direction. A connecting portion between the second arm 64B and the second bracket 28 is also slidable in the vertical direction of the vehicle. Accordingly, an angular change between the first arm 64A and the second arm 64B of the X-arm link mechanism 64 is permitted. In this embodiment, the angular change of the X-arm link mechanism 64 is permitted by inserting and sliding the link pin 38 in slots of the first bracket 24 and the second bracket 28.

Although not shown in the drawings, the drive rod 48 is suspended in the rear seat adjuster 62 so that a connecting point between the left first arm 64A and the first bracket 24 and a connecting point between the right first arm 64A and the first bracket 24 rotate about the drive rod 48. The forward and reverse rotation of the drive rod 48, powered by the power unit 40, allows the first arm 64A to reciprocally rotate in the arrow R direction in the drawings. Then, in the rear seat adjuster 62, the angular change of the X-arm link mechanism 64 that is associated with the above rotation causes the second bracket 28 to move between the forward position and the rearward position.

The second bracket 28 is configured so that the position of the second bracket 28 when it is in the forward position locates lower than that when the second bracket 28 is in the rearward position. Accordingly, in the occupant protection device 60, when the second bracket 28 is in the forward position (the seat back 18 is in the upright position), the seat back attachment portion 28A overlaps the power unit 40 and the ECU 42 in the longitudinal direction of the vehicle. In other words, the power unit 40 and the ECU 42 are disposed so that a region H, where the power unit 40 and the ECU 42 overlap the second bracket 28 that is positioned in front of the power unit 40 and the ECU 42, as viewed from the front of the vehicle.

The first arm 64A includes a curved portion that serves as a deformation-promoting portion (weakening portion). The first arm 64A extends obliquely downward toward the front from a curved portion 68 to a connecting point between the second bracket 28 and the first arm 64A, when the second bracket 28 is in the forward position as shown in FIG. 6B.

Accordingly, in the X-arm link mechanism 64, the first arm 64A bends at the curved portion 68 when the second bracket 28 in the forward position receives the rearward load exceeding the prescribed magnitude. Thus, the seat back attachment portion 28A is guided by bending deformation of the first arm 64A, and moves substantially directly to the rear in the event of a rear-end collision. The seat back attachment portion 28A then contacts the power unit 40 and the ECU 42.

In contrast, if the second bracket 28 is in the rearward position, the power unit 40 and the ECU 42 are disposed not to overlap the second bracket 28, as viewed from the front. Specifically, a gap G in the vertical direction that is shown in FIG. 6A is formed between the power unit 40 and the ECU 42. In other words, when the second bracket 28 is in the rearward position, the power unit 40 and the ECU 42 are disposed at different positions (non-overlapping position) with respect to the second bracket 28, as viewed from the front.

Further, the occupant protection device 60 cancels out a difference between the vertical position of the second bracket 28 in the forward position and the vertical position of the second bracket 28 in the rearward position. In this embodiment, a connecting portion between the upper frame 26A and the seat back attachment portion 28A include slots 66 and sliders 70 that are inserted in the slots 66. The slots 66 are formed in the upper frame 26A. The sliders 70 are connected to the second bracket 28. The upper frame 26A is slidably supported by the second bracket 28 via the sliders 70. Accordingly, the seat back attachment portion 28A is slidable in the vertical direction with respect to the upper frame 26A. Alternatively, instead of this configuration, a configuration may be adopted in which the rotational shaft 26C is slidably inserted into the slot 66, and the slot 66 is provided at the connecting portion between the upper frame 26A and the lower frame 26B. The other configurations of the occupant protection device 60 are the same as the corresponding configurations of the occupant protection device 10.

Therefore, with the occupant protection device 60 according to the second embodiment, it is possible to basically obtain the same effects as those of the occupant protection device 10 by the same functions. Specifically, in the occupant protection device 60, the seat back attachment portion 28A contacts the power unit 40 and the ECU 42 in the event of a rear-end collision. Accordingly, the intrusion of the partition panel 12 into the occupant compartment is prevented or effectively suppressed, and thus, the occupant in the rear seat 14 is protected.

In the occupant protection device 60, when the second bracket 28 is in the forward position, the seat back attachment portion 28A overlaps the power unit 40 and the ECU 42 in the longitudinal direction of the vehicle. Thus, in the occupant protection device 60, the contact of the seat back attachment portion 28A with the power unit 40 and the ECU 42 is facilitated by the load that is generated in a rear-end collision. Also, in the occupant protection device 60, in order to facilitate the contact of the seat back attachment portion 28A with the power unit 40 and the ECU 42, the lower portion of the seat back attachment portion 28A is disposed so as to face the upper portions of the power unit 40 and the ECU 42. Thus, it is possible to provide the favorable occupant protection.

Furthermore, in the occupant protection device 60, when the second bracket 28 is closest to the first bracket 24 (in the rearward position), the seat back attachment portion 28A does not overlap the power unit 40 and the ECU 42 in the longitudinal direction of the vehicle. Considering the above, when the second bracket 28 is in the rearward position, it is configured, for example, so that the seat back attachment portion 28A is located above the power unit 40 and the ECU 42. Thus, the longitudinal dimension of the rear seat adjuster 62 can be compact in the longitudinal direction of the vehicle. In particular, the compact dimensions of the rear seat adjuster 62, which is disposed between the partition panel 12 and the seat back 18, in the longitudinal direction of the vehicle contributes to efficient use of a space in the occupant compartment.

Next, a third embodiment is described. FIG. 7A is a side view that shows the seat back 18 when adjusted to the rearward position in the occupant protection device 80 according to the third embodiment. FIG. 7B is a side view that shows the seat back 18 when adjusted to the forward position. As shown in the drawings, the occupant protection device 80 includes a rear seat adjuster 82 instead of the rear seat adjuster 22, and thus, differs from the occupant protection device 10. In addition, the rear seat adjuster 82 includes a parallel arm link mechanism 84, which is the link mechanism and the reclining angle adjustment portion, instead of the link mechanism 30, and thus, differs from the rear seat adjuster 22.

Specifically, the parallel arm link mechanism 84 includes a first arm 84A and a second arm 84B. A rear end of the first arm 84A is connected to the lower portion of the first bracket 24. A front end of the first arm 84A is connected to the lower portion of the second bracket 28. A rear end of the second arm 84B is connected to the upper portion of the first bracket 24. A front end of the second arm 84B is connected to the upper portion of the second bracket 28. The first arm 84A is disposed substantially parallel with the second arm 84B.

In the parallel arm link mechanism 84, the first arm 84A and the second arm 84B swing (reciprocate in the arrow R direction in the drawings) while remaining substantially parallel with each other. Accordingly, the second bracket 28 moves between the forward position and the rearward position. Although not shown in the drawings, the drive rod 48 is suspended in the rear seat adjuster 82 so that a connecting point between the left first arm 84A and the first bracket 24 and a connecting point between the right first arm 84A and the first bracket 24 rotate about the drive rod 48. The forward and reverse rotation of the drive rod 48, powered by the power unit 40, allow the second bracket 28 to move between the forward position and the rearward position.

The second bracket 28 in the forward position is configured so that it is located lower than the second bracket 28 in the rearward position. Accordingly, in the occupant protection device 80, when the second bracket 28 is in the forward position (the seat back 18 is in the upright position), the seat back attachment portion 28A overlaps the power unit 40 and the ECU 42 in longitudinal direction of the vehicle.

A notched portion 86, which serves as the deformation-promoting portion (weakening portion), is formed in the first arm 84A. The notch portion 86 is formed by cutting away a portion of the lower edge of the first arm 84A. Accordingly, in the parallel arm link mechanism 84, the first arm 84A bends at the notch portion 86 when the second bracket 28 in the forward position receives a rearward load that exceeds the prescribed magnitude. Thus, when the second bracket 28 in the forward position receives the rearward load exceeding the prescribed magnitude, the seat back attachment portion 28A is guided by the first arm 84A, which bends and deforms as described above, and moves substantially rearward, without the rotation of the first arm 84A in the upward and rearward direction of a arrowed line R. The seat back attachment portion 28A then contacts the power unit 40 and the ECU 42. In this embodiment, the notch portion 86 is also formed in a lower edge of the second arm 84B. Thus, when the second bracket 28 receives the rearward load that exceeding the prescribed magnitude, the seat back attachment portion 28A is guided by the upper and lower arms 84A and 84B and horizontally moves substantially rearward. The seat back attachment portion 28A then contacts the power unit 40 and the ECU 42. Instead of including the notched portion 86A that serves as the deformation-promoting portion, the first arm 84A and the second arm 84B may be partially or fully bent or curved into an upward concave shape when the second bracket 28 is in the forward position.

In contrast, if the second bracket 28 is in the rearward position, the power unit 40 and the ECU 42 are disposed so as not to overlap the second bracket 28, as viewed from the front.

In other words, the power unit 40 and the ECU 42 are disposed a different position from the second bracket 28, as viewed from the front.

The other configurations of the occupant protection device 80 are the same as the corresponding configurations of the occupant protection device 10 or those of the occupant protection device 60.

Therefore, with the occupant protection device 80 it is possible to basically obtain the same functions and the same effects as those of the occupant protection device 10. Specifically, in the occupant protection device 80, the seat back attachment portion 28A contacts the power unit 40 and the ECU 42 when a rear-end collision occurs. Accordingly, the intrusion of the partition panel 12 to the occupant compartment is prevented or effectively suppressed, and thus, the occupant in the rear seat 14 is protected.

In the occupant protection device 80, when the second bracket 28 is in the forward position, the seat back attachment portion 28A longitudinally overlaps the power unit 40 and the ECU 42. Therefore, as with the occupant protection device 60, the occupant protection device 80 also provides favorable occupant protection performance. Further, as in the occupant protection device 60, the longitudinal dimension of the rear seat adjuster 82 can be compact.

In each of the above embodiments, an example configuration is described in which the power unit 40 and the ECU 42 form the contact portion that contacts the seat back attachment portion 28A in the event of a rear-end collision. However, the present invention is not restricted to the above configuration. For example, another vehicle member may be adopted as the contact portion. Alternatively, either one of the power unit 40 or the ECU 42 alone may be disposed at the substantial center in the seat width direction to serve as the contact portion.

Each of the above embodiments is configured with the power unit 40 fixedly supported in the left side of the region between the right first bracket 24 and the left first bracket 24, and with the ECU 42 fixedly supported in the right side of the region between the right first bracket 24 and the left first bracket 24. However, the present invention is not restricted to the above configuration. For example, the power unit 40 may be fixedly supported in the right side, and the ECU 42 may be fixedly supported in the left side.

In the above embodiments, the seat back 18 is provided such that the seat back moves between the forward position (a position in front of the rearward position) and the rearward position as the maximum reclined position. For example, according to the forward position, the seat back 18 may be moved to the maximum forward position when the seat back 18 is moved based on the operation of the reclining adjustment switch 5, and may be moved to the middle position between the maximum forward position and the maximum reclining position when the collision prediction sensor 50 determines that the rear-end collision is imminent. Also, the forward position when the rear-end collision is predicted matches the maximum forward position when seat back 18 is manually operated. That is, the forward position can be any position as long as the occupant is appropriately restrained by the occupant restraint system, such as the air bag, and the seat belt.

In the above embodiments, the rear seat adjusters 22, 62, and 82 are provided between the partition panel 12 and the seat back 18. However, the present invention is not restricted to the above configurations. For example, a configuration may be adopted in which the second bracket 28 is supported by the seat cushion 16 through a movable mechanism and in which the contact portion is provided between the second bracket 28 and the partition panel 12.

Further, in the above embodiments, the occupant protection devices 10, 60, and 80 are applied to the rear seat 14. However, the present invention is not restricted to this configuration. For example, the present invention may be applied to a driver seat or a passenger seat of a two-seat automobile.

The invention claimed is:

1. An occupant protection device comprising:
   a seat cushion;
   a seat back;
   a base portion provided in a vehicle body;
   a support portion that is provided in the seat back and that overlaps a backrest of the seat back, as viewed from front of a vehicle;
   a reclining angle adjustment portion that changes a reclining angle of the seat back by moving the support portion with respect to the base portion; and
   a contact portion that is provided in the vehicle body,
   wherein, if the support portion is displaced rearward in a longitudinal direction of the vehicle due to a rearward load that exceeds a prescribed magnitude being applied to the seat back, the contact portion comes into contact with the support portion on both the right and left sides of the seat back with respect to a center portion of the seat back.

2. The occupant protection device according to claim 1, wherein
   the reclining angle adjustment portion adjusts a position of the support portion between a forward position and a rearward position, and
   when the support portion is in the forward position, the contact portion at least partially overlaps with the support portion, as viewed from the front of the vehicle.

3. The occupant protection device according to claim 2, wherein
   when the support portion is in the rearward position, a region where the contact portion is located differs from a region where the support portion is located, as viewed from the front of the vehicle.

4. The occupant protection device according to claim 3, wherein
   when the support portion is in the rearward position, a gap is present between the contact portion and the support portion, as viewed from the front of the vehicle.

5. The occupant protection device according to claim 2, wherein
   the contact portion is a drive source for the reclining angle adjustment portion that generates power to move the support portion, and a control unit that controls the drive source,
   wherein the drive source contacts the support portion on one of the right side and the left side of the seat back with respect to the center portion of the seat back, and
   the control unit contacts the support portion on the other of the right side and the left side of the seat back with respect to the center portion of the seat back.

6. The occupant protection device according to claim 5, wherein
   the drive source and the control unit are provided at substantially same height.

7. The occupant protection device according to claim 5, further comprising
   a collision prediction sensor that determines whether a rear-end collision is imminent,
   wherein the control unit controls the drive source to move the support portion to the forward position when the collision prediction sensor determines that the rear-end collision is imminent.

8. The occupant protection device according to claim 1, wherein
   the reclining angle adjustment portion is a link mechanism that connects the link mechanism to the base portion and the support portion and that has multiple links,
   at least one link of the link mechanism includes a deformation-promoting portion that undergoes bending deformation when the rearward load is input to the seat back, and
   the support portion is guided toward the contact portion due to deformation of the link at the deformation-promoting portion.

9. The occupant protection device according to claim 1, wherein
   the base portion and the contact portion is fixed to a panel member that separates an occupant compartment and a space that is located behind the occupant compartment.

10. An occupant protection device comprising:
    a seat cushion;
    a seat back;
    a base portion that is provided in a vehicle body;
    a support portion that is provided in the seat back and that overlaps a backrest of the seat back, as viewed from front of a vehicle;
    a reclining angle adjustment portion that changes a reclining angle of the seat back by moving the support portion with respect to the base portion; and
    a contact portion that is provided in the vehicle body,
    wherein, if the support portion is displaced rearward in a longitudinal direction of the vehicle due to a rearward load that exceeds a prescribed magnitude being applied to the seat back, the contact portion contacts the support portion and suppresses rearward displacement of the support portion and rotation of the support portion about an axis along a vertical direction of the vehicle.

* * * * *